(12) United States Patent
Sayers

(10) Patent No.: US 8,024,124 B2
(45) Date of Patent: Sep. 20, 2011

(54) DETERMINING MAXIMUM HORIZONTAL STRESS IN AN EARTH FORMATION

(75) Inventor: Colin Michael Sayers, Katy, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 517 days.

(21) Appl. No.: 12/333,347

(22) Filed: Dec. 12, 2008

(65) Prior Publication Data

US 2009/0164129 A1 Jun. 25, 2009

Related U.S. Application Data

(60) Provisional application No. 61/013,926, filed on Dec. 14, 2007.

(51) Int. Cl.
*G06F 19/00* (2011.01)
(52) U.S. Cl. .......................................................... 702/11
(58) Field of Classification Search ............... 702/11, 702/13, 14, 182–185, 188
See application file for complete search history.

(56) References Cited

U.S. PATENT DOCUMENTS

| | | | |
|---|---|---|---|
| 5,838,633 A | 11/1998 | Sinha | |
| 6,098,021 A | 8/2000 | Tang et al. | |
| 6,351,991 B1 | 3/2002 | Sinha | |
| 6,609,067 B2* | 8/2003 | Tare et al. | 702/9 |
| 6,904,365 B2 | 6/2005 | Bratton et al. | |
| 6,950,748 B2 | 9/2005 | Liu et al. | |
| 7,042,802 B2 | 5/2006 | Sinha | |
| 7,157,915 B2 | 1/2007 | Schoen et al. | |
| 7,649,804 B2* | 1/2010 | Sinha | 367/35 |
| 2003/0212495 A1* | 11/2003 | Mese et al. | 702/9 |
| 2009/0070042 A1* | 3/2009 | Birchwood et al. | 702/11 |

OTHER PUBLICATIONS

Lee, D., Birchwood, R., Bratton, T., "Leak-Off Interpretation and Modeling with Application to Geomechanics", American Rock Mechanics Association, Jun. 5-9, 2004, 13 pages.
Sayers, C. M., "Stress-Dependent Elastic Anisotrophy of Sandstones", European Association of Geoscientists and Engineers, May 2001, 11 pages.
Sayers, C. M., "Sensitivity of Elastic-Wave Velocities to Stress Changes in Sandstones", The Leading Edge, Dec. 2005, 4 pages.
Sayers, C. M. "Effects of Borehole Stress Concentration on Elastic Wave Velocities in Sandstones", SEG/New Orleans 2006 Annual Meeting, Jan. 2006, 5 pages.
Sayers, C. M., Kachanov, M., "Microcrack-Induced Elastic Wave Anisotrophy of Brittle Rocks", American Geophysical Union, Mar. 10, 1995, 8 pages.

* cited by examiner

*Primary Examiner* — Edward Raymond
(74) *Attorney, Agent, or Firm* — Osha Liang LLP

(57) ABSTRACT

The invention relates to a method for determining maximum horizontal stress in an earth formation. The method includes obtaining fast shear wave velocities ($V_{s1}$) and slow shear wave velocities ($V_{s2}$) for various depths in the earth formation, calculating shear wave anisotropy ($A^{data}$) using $V_{s1}$ and $V_{s2}$, obtaining vertical stress ($S_v$) and minimum horizontal stress ($S_h$) for the formation, representing maximum horizontal stress ($S_H$) using a parameterized function having at least one parameter and using $S_h$ and $S_v$ as input, determining a value of the at least one parameter by minimizing a cost function that represents a measure of difference between $A^{data}$ and $A^{pred}$ for the various depths and $A^{pred}$ is predicted shear wave anisotropy determined using $S_v$, $S_h$, and $S_H$, calculating $S_H$ using the parameterized function and the value of the at least one parameter, and storing $S_H$ in relation to the earth formation.

20 Claims, 7 Drawing Sheets

DETERMINING MAXIMUM HORIZONTAL STRESS IN AN EARTH FORMATION

CROSS REFERENCE TO RELATED APPLICATION

This application claims priority, pursuant to 35 U.S.C. §119(e), to the filing date of U.S. Patent Application Ser. No. 61/013,926 entitled "METHOD AND SYSTEM FOR DETERMINING MAXIMUM HORIZONTAL STRESS," filed on Dec. 14, 2007, which is hereby incorporated by reference in its entirety.

BACKGROUND

Knowledge of the in-situ stress field and pore pressure in sedimentary basins is fundamental to the analysis and prediction of geomechanical problems encountered in the petroleum industry. Examples of geomechanical problems include wellbore stability and fracturing of the formation during drilling that may lead to financial loss due to losses, kicks, stuck pipe, extra casing strings and sidetracks. Geomechanical problems may also include problems due to reservoir stress changes occurring during production such as reservoir compaction, surface subsidence, formation fracturing, casing deformation and failure, sanding, reactivation of faults and bedding parallel slip.

In general, the in-situ stress field may be represented as a second-rank tensor with three principal stresses. In the simplest case in which one of these is vertical, the three principal stresses are the vertical stress denoted by $S_V$, the minimum horizontal stress denoted by $S_h$, and the maximum horizontal stress denoted by $S_H$. The vertical stress may be estimated from an integral of the density log, while the minimum horizontal stress may be estimated using a poroelastic equation. The maximum horizontal stress is more difficult to evaluate. Accordingly, simple approximations are typically used to determine/estimate the value of the maximum horizontal stress.

The following are examples of the simple approximations used to determine/estimate the maximum horizontal stress: (i) approximating the maximum horizontal stress by setting it equal to the minimum horizontal stress; (ii) approximating the maximum horizontal stress by setting it equal to the average of the vertical stress and minimum horizontal stress; and (iii) approximating the maximum horizontal stress by setting it equal to the minimum horizontal stress multiplied by a factor greater than one. By approximating the value of maximum horizontal stress, errors may occur in the accuracy of the resulting values calculated using the approximations.

SUMMARY

The invention relates to a method for determining maximum horizontal stress in an earth formation. The method includes obtaining fast shear wave velocities ($V_{s1}$) and slow shear wave velocities ($V_{s2}$) for various depths in the earth formation, calculating shear wave anisotropy ($A^{data}$) using $V_{s1}$ and $V_{s2}$, obtaining vertical stress ($S_v$) and minimum horizontal stress ($S_h$) for the formation, representing maximum horizontal stress ($S_H$) using a parameterized function having at least one parameter and using $S_h$ and $S_v$ as input, determining a value of the at least one parameter by minimizing a cost function that represents a measure of difference between $A^{data}$ and $A^{pred}$ for the various depths and $A^{pred}$ is predicted shear wave anisotropy determined using $S_v$, $S_h$, and $S_H$, calculating $S_H$ using the parameterized function and the value of the at least one parameter, and storing $S_H$ in relation to the earth formation.

Other aspects of determining maximum horizontal stress in an earth formation will be apparent from the following description and the appended claims.

DETAILED DESCRIPTION

Figure 1A:
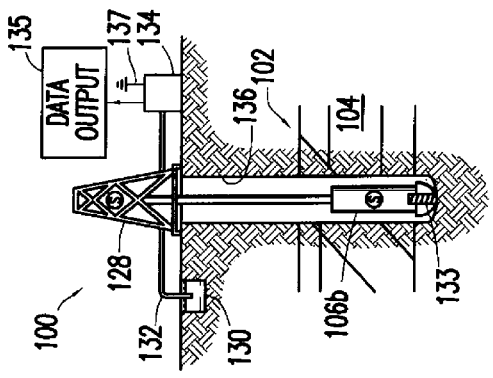
FIGS. 1A-1D shows simplified, representative, schematic views of an oilfield in which embodiments of determining maximum horizontal stress in an earth formation can be implemented.

Specific embodiments of determining maximum horizontal stress in an earth formation will now be described in detail with reference to the accompanying figures. Like elements in the various figures are denoted by like reference numerals for consistency.

In the following detailed description of embodiments of determining maximum horizontal stress in an earth formation, numerous specific details are set forth in order to provide a more thorough understanding of determining maximum horizontal stress in an earth formation. However, it will be apparent to one of ordinary skill in the art that determining maximum horizontal stress in an earth formation may be practiced without these specific details. In other instances, well-known features have not been described in detail to avoid unnecessarily complicating the description.

In general, embodiments relate to determining the maximum horizontal stress for an earth formation. The maximum horizontal stress may then be used in a mechanical earth model (MEM), which in turn may be used to adjust an oilfield operation in the formation. In one embodiment, the oilfield operation may be a planned drilling operation (i.e., an operation performed before drilling has commenced), a current drilling operation (i.e., an operation performed after drilling has commenced), an operation during production of a well, etc. In one embodiment, the oilfield operation is to be performed (or is being performed) on a deviated well.

FIGS. 1A-1D depict simplified, representative, schematic views of an oilfield (100) having subterranean formation (102) containing reservoir (104) therein and depicting various oilfield operations being performed on the oilfield (100). FIG. 1A depicts a survey operation being performed by a survey tool, such as seismic truck (106a) to measure properties of the subterranean formation. The survey operation is a seismic survey operation for producing sound vibrations (112). In FIG. 1A, one such sound vibration (112) generated by a source (110) and reflects off a plurality of horizons (114) in an earth formation (116). The sound vibration(s) (112) is (are) received in by sensors (S), such as geophone-receivers (118), situated on the earth's surface, and the geophone-receivers (118) produce electrical output signals, referred to as data received (120) in FIG. 1A.

In response to the received sound vibration(s) (112) representative of different parameters (such as amplitude and/or frequency) of the sound vibration(s) (112), the geophones (118) produce electrical output signals containing data concerning the subterranean formation (102). The data received (120) is provided as input data to a computer (122a) of the seismic truck (106a), and responsive to the input data, the computer (122a) generates a seismic data output record (124). The seismic data may be stored, transmitted or further processed as desired, for example by data reduction.

Figure 1B:
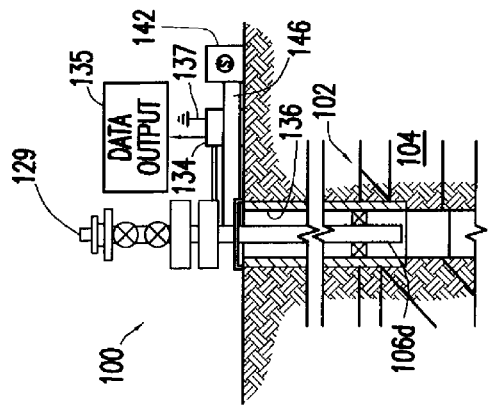

FIG. 1B depicts a drilling operation being performed by drilling tools (106b) suspended by a rig (128) and advanced into the subterranean formation (102) to form a wellbore (136). A mud pit (130) is used to draw drilling mud into the drilling tools (106b) via flow line (132) for circulating drilling mud through the drilling tools (106b), up the wellbore and back to the surface. The drilling tools (106b) are advanced into the subterranean formations (102) to reach reservoir (104). Each well may target one or more reservoirs. The drilling tools (106b) may be adapted for measuring downhole properties using logging while drilling tools (106b). The logging while drilling tool (106b) may also be adapted to take core samples (133) as shown, or removed so that a core sample (133) may be taken using another tool.

A surface unit (134) is used to communicate with the drilling tools (106b) and/or offsite operations. The surface unit (134) is capable of communicating with the drilling tools (106b) to send commands to the drilling tools (106b) and to receive data therefrom. The surface unit (134) may be provided with computer facilities for receiving, storing, processing, and/or analyzing data from the oilfield (100). The surface unit (134) collects data generated during the drilling operation and produces data output (135) which may be stored or transmitted. Computer facilities, such as those of the surface unit (134), may be positioned at various locations about the oilfield (100) and/or at remote locations.

Sensors (S), such as gauges, may be positioned about the oilfield to collect data relating to various oilfields operations as described previously. As shown, the sensor (S) is positioned in one or more locations in the drilling tools and/or at the rig to measure drilling parameters, such as weight on bit, torque on bit, pressures, temperatures, flow rates, compositions, rotary speed and/or other parameters of the oilfield operation. Sensor (S) may also be positioned in one or more locations in the circulating system.

The data gathered by the sensors (S) may be collected by the surface unit (134) and/or other data collection sources for analysis or other processing. The data collected by the sensors (S) may be used alone or in combination with other data. The data may be collected in one or more databases and/or transmitted onsite or offsite. All or select portions of the data may be selectively used for analyzing and/or predicting oilfield operations of the current and/or other wellbores, including the reservoir. The data may be historical data, real time data, or combinations thereof. The real time data may be used in real time, or stored for later use. The data may also be combined with historical data or other inputs for further analysis. The data may be stored in separate databases or combined into a single database.

The collected data may be used to perform analysis, such as modeling operations. For example, the seismic data output may be used to perform geological, geophysical, and/or reservoir engineering. The reservoir, wellbore, surface and/or process data may be used to perform reservoir, wellbore, geological, geophysical or other simulations. The data outputs from the oilfield operation may be generated directly from the sensors (S), or after some preprocessing or modeling. These data outputs may act as inputs for further analysis.

The data is collected and stored at the surface unit (134). One or more surface units (134) may be located at the oilfield (100), or connected remotely thereto. The surface unit (134) may be a single unit, or a complex network of units used to perform the necessary data management functions throughout the oilfield (100). The surface unit (134) may be a manual or automatic system. The surface unit (134) may be operated and/or adjusted by a user.

The surface unit (134) may be provided with a transceiver (137) to allow communications between the surface unit (134) and various portions of the oilfield (100) or other locations. The surface unit (134) may also be provided with or functionally connected to one or more controllers for actuating mechanisms at the oilfield (100). The surface unit (134) may then send command signals to the oilfield (100) in response to data received. The surface unit (134) may receive commands via the transceiver or may itself execute commands to the controller. A processor (not shown) may be provided to analyze the data (locally or remotely) and make the decisions and/or actuate the controller. In this manner, the oilfield (100) may be selectively adjusted based on the data collected. This technique may be used to optimize portions of the oilfield operation, such as controlling drilling, weight on bit, pump rates or other parameters. These modifications may be made automatically based on computer protocol, and/or manually by an operator. In some cases, well plans may be adjusted to select optimum operating conditions, or to avoid problems.

Figure 1C:
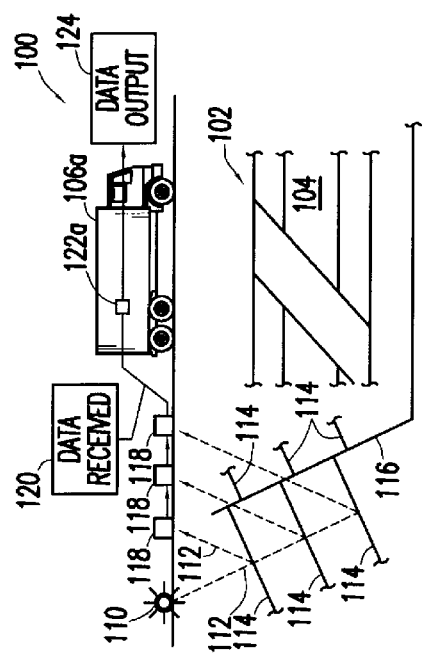

FIG. 1C depicts a wireline operation being performed by a wireline tool (106c) suspended by the rig (128) and into the wellbore (136) of FIG. 1B. The wireline tool (106c) may be adapted for deployment into a wellbore (136) for generating well logs, performing downhole tests and/or collecting samples. The wireline tool (106c) may be used to provide another method and apparatus for performing a seismic survey operation. The wireline tool (106c) of FIG. 1C may, for example, have an explosive, radioactive, electrical, or acoustic energy source (144) that sends and/or receives electrical signals to the surrounding subterranean formations (102) and fluids therein.

The wireline tool (106c) may be operatively connected to, for example, the geophones (118) stored in the computer (122a) of the seismic truck (106a) of FIG. 1A. The wireline tool (106c) may also provide data to the surface unit (134). The surface unit (134) collects data generated during the wireline operation and produces data output (135) that may be stored or transmitted. The wireline tool (106c) may be positioned at various depths in the wellbore (136) to provide a survey or other information relating to the subterranean formation (102).

Sensors (S), such as gauges, may be positioned about the oilfield to collect data relating to various oilfield operations as described previously. As shown, the sensor (S) is positioned in the wireline tool (106c) to measure downhole parameters, which relate to, for example porosity, permeability, fluid composition, and/or other parameters of the oilfield operation.

Figure 1D:
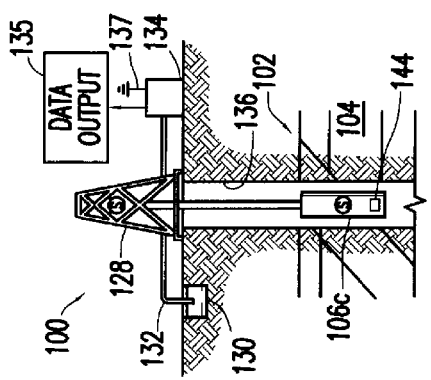

FIG. 1D depicts a production operation being performed by a production tool (106d) deployed from a production unit or christmas tree (129) and into the completed wellbore (136) of FIG. 1C for drawing fluid from the downhole reservoirs into the surface facilities (142). Fluid flows from reservoir (104) through perforations in the casing (not shown) and into the production tool (106d) in the wellbore (136) and to the surface facilities (142) via a gathering network (146).

Sensors (S), such as gauges, may be positioned about the oilfield to collect data relating to various oilfield operations as described previously. As shown, the sensor (S) may be positioned in the production tool (106d) or associated equipment, such as the christmas tree (129), gathering network (146), surface facilities (142) and/or the production facility, to measure fluid parameters, such as fluid composition, flow rates, pressures, temperatures, and/or other parameters of the production operation.

While simplified wellsite configurations are shown, it will be appreciated that the oilfield may cover a portion of land, sea and/or water locations that hosts one or more wellsites. Production may also include injection wells (not shown) for added recovery. One or more gathering facilities may be operatively connected to one or more of the wellsites for selectively collecting downhole fluids from the wellsite(s).

While FIGS. 1B-1D depict tools used to measure properties of an oilfield (100), it will be appreciated that the tools may be used in connection with non-oilfield operations, such as mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation (102) and/or its geological formations may be used. Various sensors (S) may be located at various positions along the wellbore and/or the monitoring tools to collect and/or monitor the desired data. Other sources of data may also be provided from offsite locations.

The oilfield configurations in FIGS. 1A-1D are intended to provide a brief description of an example of an oilfield usable with embodiments of determining maximum horizontal stress in an earth formation. Part, or all, of the oilfield (100) may be on land and/or sea. Also, while a single oilfield measured at a single location is depicted, the present invention may be used with any combination of one or more oilfields (100), one or more processing facilities, and one or more wellsites.

Figure 2:
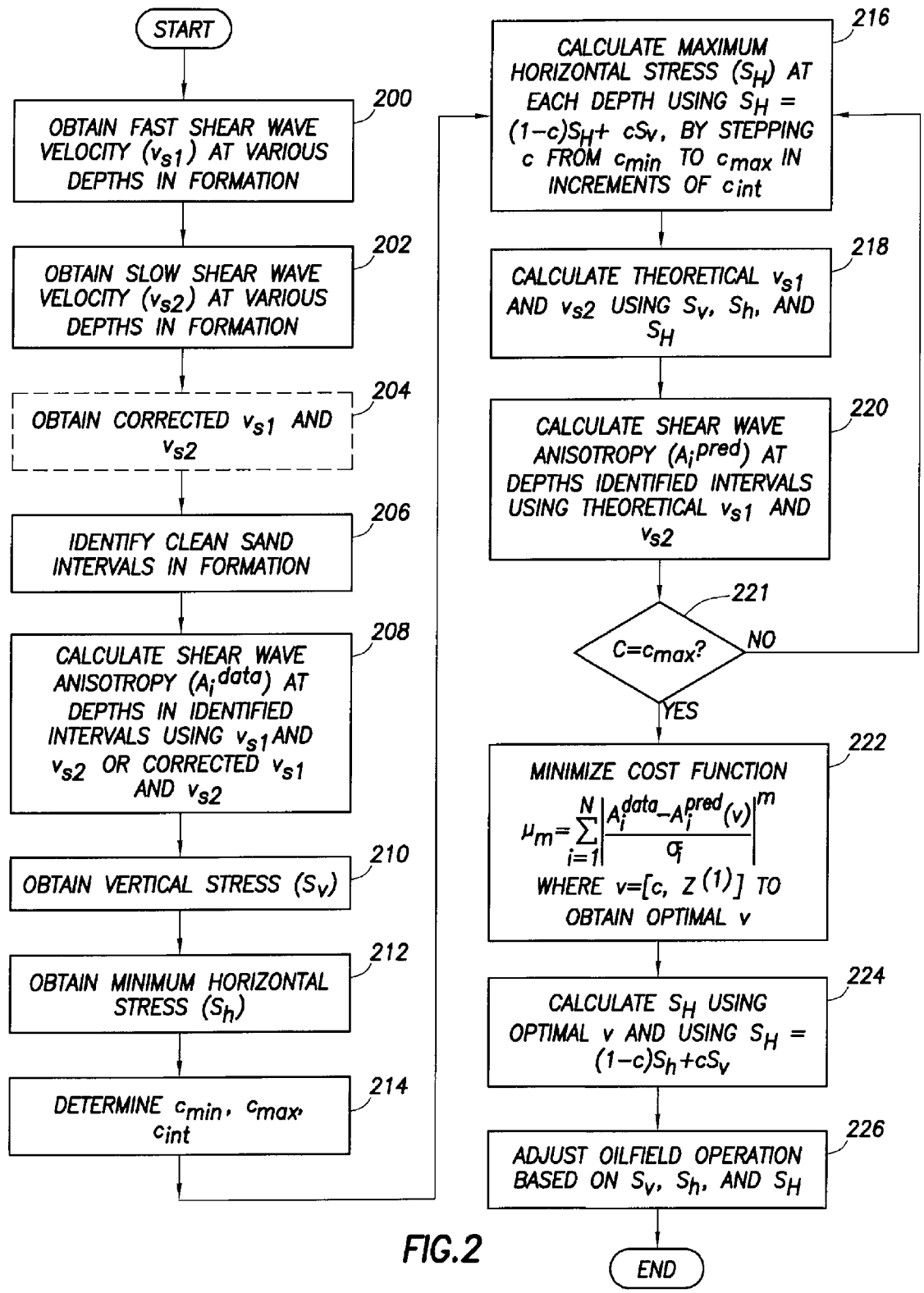
FIG. 2 shows a method in accordance with one embodiment of determining maximum horizontal stress in an earth formation.

FIG. 2 shows a method in accordance with one embodiment of determining maximum horizontal stress in an earth formation. In one or more embodiments of determining maximum horizontal stress in an earth formation, one or more of the elements shown in FIG. 2 may be omitted, repeated, and/or performed in a different order. Accordingly, embodiments of determining maximum horizontal stress in an earth formation should not be considered limited to the specific arrangement of elements shown in FIG. 2.

In element 200, fast shear wave velocity ($V_{s1}$) is obtained from various depths in the formation. In one embodiment, a dipole shear sonic tool (such as the Sonic Scanner Tool) is used to obtain $V_{s1}$.

In element 202, slow shear wave velocity ($V_{s2}$) is obtained from various depths in the formation. In one embodiment, a dipole shear sonic tool (such as the Sonic Scanner Tool) is used to obtain $V_{s2}$.

Optionally, in element 204, $V_{s1}$ and $V_{s2}$ may be corrected using the following equation: $V=V_o-a_1\phi-a_2 VCL$, where $\phi$ is the porosity of the formation, VCL is the volume fraction of clay in the formation, and $a_1$ and $a_2$ are constants. Values for $a_1$ and $a_2$ may be determined using regression analysis and values of $V_{s1}$ and $V_{s2}$ at various depths in the formation. The following equation may then be used to correct the measured values of $V_{s1}$ and $V_{s2}$ (obtained in elements 200 and 202): $V_{corrected}=V_{measured}+a_1\phi+a_2 VCL$.

In element 206, sand intervals in the formation are identified. In one embodiment, a sand interval corresponds to a depth range in the formation in which the volume fraction of clay (VCL) is less than or equal to 0.4. In another embodiment the VCL may be less than or equal to 0.2. The formation may have multiple sand intervals at different depths.

In element 208, the shear wave anisotropy ($A^{data}$) is calculated as $A_i^{data}$ for various depths (indexed by i) in the intervals identified in element 206 using $V_{s1}$ and $V_{s2}$ (or their corrected versions) obtained in elements 200 and 202 (and data optionally, element 204). In one embodiment, $A^{data}$ is calculated using the following equation, where A represents one of measured shear wave anisotropy ($A^{data}$) or predicted shear wave anisotropy ($A^{pred}$): $A=2(v_{S1}-V_{S2})/(v_{S1}+V_{S2})$.

In element 210, the vertical stress ($S_v$) for the formation is obtained. In element 212, the minimum horizontal stress ($S_h$) for the formation is obtained. In one embodiment, the $S_v$ and $S_h$ are obtained by conventional methods known in the art based on a MEM. In one embodiment, the MEM includes pore pressure, far-field stresses, elastic parameters obtained using established geomechanical methods. For example, the pore pressure may be measured using the downhole tools or predicted using elastic wave velocity or resistivity measurements, the stress orientation may be determined from the fast shear wave polarization or from borehole breakouts, the vertical stress may be estimated from an integral of the density log, and the minimum horizontal stress may be determined from leak-off test data, hydraulic fractures, log data, borehole images, mud losses and mini-frac tests. Those skilled in the art will appreciate that other methods for obtaining the aforementioned information may be used. In one embodiment, compressional wave velocity may also be obtained at various depths in the formation and used to determine, for example, elastic moduli.

In element 214, $c_{min}$, $c_{max}$, and $c_{int}$ are determined, where $c_{min}$ is the minimum value for c (e.g., 0), $c_{max}$ is the maximum value for c (e.g., 2.0) and $c_{int}$ is the interval size (e.g., 0.1). Those skilled in the art will appreciate that other values for $c_{min}$, $c_{max}$, and $c_{int}$ may be used and that $c_{int}$ may be of variable value. The elements 216 through 220 below are iterated by stepping the parameter c from $c_{min}$ to $c_{max}$ in increments of $c_{int}$.

In element 216, the maximum horizontal stress ($S_H$) is calculated using the following equation: $S_H=(1-c)S_h+cS_v$, where $S_v$ and $S_h$ are obtained in elements 210 and 212. In one embodiment, $S_H$ is calculated using the following formula: $S_H=(1+c)*S_h$. In another embodiment, $S_H$ is calculated using the following formula: $S_H=(1+c)*S_v$. In these embodiments, the value for c is obtained from element 214. In another embodiment, $S_H$ is calculated using a parameterized function having at least one parameter (e.g., c and optionally additional other parameters) where the parameterized function uses $S_h$ and $S_V$ as inputs. In one embodiment, a value of $S_H$ exists for every value of c between $c_{min}$ and $c_{max}$, at the intervals specified by $c_{int}$. For example, if $c_{min}=0$, $c_{max}=20.0$, and $c_{int}=0.1$, then there is a value of $S_H$ for each of the following values of c: 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, and 2.0. Those skilled in the art will appreciate that the values of c between $c_{min}$ and $C_{max}$ may not be in uniform intervals (or increments); rather, one may select any values between $c_{min}$ and $c_{max}$ (in addition, $c_{min}$ and $c_{max}$ may also be selected as values for c). In one embodiment, c may also be less than zero (i.e., negative).

In element 218, each combination of $S_v$ (obtained in element 210), $S_h$ (obtained in element 212), and $S_H$ (obtained in element 216) is used to calculate values for $V_{s1}$ and $V_{s2}$ (i.e., theoretical values for $V_{s1}$ and $V_{s2}$). In one embodiment, a function (or set of functions) that relates stress to velocity, is used. Detailed examples of this function (or set of functions)

involving the determination of one parameter (denoted as $Z^{(1)}$) are described in examples following the descriptions of FIG. 3-6 below. The set of functions may be treated as parameterized functions having parameter $Z^{(1)}$ with pre-determined values ($p_1, p_2, \ldots p_n$). Theoretical values for $V_{s1}$ and $V_{s2}$ may be determined for each of these pre-determined values ($p_1, p_2, \ldots p_n$). More details of the parameter $Z^{(1)}$ are included in the description of a theoretical model in the examples where the physical meaning of $Z^{(1)}$ is described. The pre-determined values ($p_1, p_2, \ldots p_n$) may be empirically determined using a measurement based on the physical meaning. In one embodiment, the set of functions uses a single reference location in the formation as the basis for the calculations and subsequent calculations are calculated based on this referenced location. By setting the reference location prior to beginning the calculations, less data and fewer calculations may be required to determine theoretical values for $V_{s1}$ and $V_{s2}$. More details are described in examples following the descriptions of FIG. 3-6 below.

In another embodiment, the parameterized functions described above are used to perform the following calculations: (i) evaluate the anisotropic elastic stiffness using the pore pressure, $S_V$ (calculated in element 210), $S_h$ (calculated in element 212) and $S_H$ (calculated in element 210); (ii) solving the Christoffel equations known in the art using the anisotropic elastic stiffness to calculate the wave velocities for propagation along a wellbore in the formation; and (iii) calculating the predicted shear wave anisotropy (i.e., $A^{pred}$) from the velocities (i.e., theoretical values for $V_{s1}$ and $V_{s2}$) that result from solving the Christoffel equations.

In one embodiment, other functions known in the art are used to determine values for theoretical values for $V_{s1}$ and $V_{s2}$. These functions may involve a determination of parameters equal to the third-order elastic constants. Those skilled in the art will appreciate that still other functions (or set of functions) may be used.

In element 220, the shear wave anisotropy ($A^{pred}$) is calculated as $A_i^{data}$ for various depths (indexed by i) in the intervals identified in element 206 using the theoretical values for $V_{s1}$ and $V_{s2}$ obtained in element 218 and the equation in element 208.

In element 221, a determination is made about whether $c=c_{max}$. If $c=C_{max}$ then the method proceeds to element 222. Otherwise, the method proceeds to element 216 to continue iterating through elements 216 through 220.

In element 222, a cost function is minimized to determine the optimal value for v, where $v=[c, Z^{(1)}]$. The optimal value of c is obtained accordingly. The cost function is formulated to represent a measure of difference between $A^{data}$ and $A^{pred}$ for the various depths while the optimal value for v is determined from the ranges of c (i.e., $C_{min}$ to $c_{max}$ in increments of $c_{int}$) and $Z^{(1)}$ (i.e., $p_1, p_2, \ldots p_n$). As discussed above, there may be additional parameters involved in v depending on the parameterized functions used in element 216. In one embodiment, the cost function is $$\mu_m = \sum_{i=1}^{N} \left| \frac{A_i^{data} - A_i^{pred}(v)}{\sigma_i} \right|^m,$$

where $\sigma_i$ is an estimate of the error (e.g., measurement error of the downhole tool) in the shear wave anisotropy at the ith depth in the intervals. Note that throughout this document other than for this equation, σ is used to represent stress as is conventional in the art. Referring to the cost function, the contribution of the term at each ith depth to the cost function is inversely proportional to the corresponding estimate of error. If an estimate of the error is unavailable, the value $\sigma_i=1$ may be used. The choice m=2 corresponds to least-squares inversion. In one embodiment, setting m=1 may be more robust in the presence of noise. As discussed above, $A^{data}$ is obtained in element 208 and $A^{pred}$ is calculated in element 220.

In element 224, in one embodiment, the final value of $S_H$ is determined using the c determined from an optimal value of v. The value of c is used in the following equation: $S_H=(1-c)S_h+cS_V$. In other embodiments, the final value of $S_H$ is determined using other equations that relate $S_H$ to c. For example, $S_H$ may be calculated using $S_H=(1+c)*S_h$, $S_H=(1+c)*S_V$, or the other parameterized function used in element 216. In element 226, $S_V$, $S_h$, and $S_H$ are used to update the MEM, which in turn is used to determine whether to adjust the oilfield operation. Once a determination is made to adjust the oilfield operation, it is subsequently adjusted.

The following are examples, for illustration purpose, of practicing the method of FIG. 2 in the oilfield of FIG. 1. The following example is not intended to limit the scope of the aforementioned embodiments.

Turning to the example, as is well known to those skilled in the art, the vertical stress may be computed by integrating formation density ρ from the surface to the depth of interest:

$$S_V(z) = g \int_0^z \rho(z)\,dz \tag{1}$$

In order to evaluate the vertical stress using equation (1), an estimate of density (ρ) is involved at various depths. Below the mudline, the following depth trend may be used: $\rho(z)=\rho_0+az^b$ (2), where z is depth below mudline and a and b are constants that may be established using a fit of the available density data. The vertical stress may then be calculated from equation (1) by taking into account the pressure exerted by the column of fluid.

As is well known to those skilled in the art, the minimum horizontal stress may be estimated using the following equation: $S_h-\alpha p=K_0(S_V-\alpha p)$ (note alpha inserted on right hand side of equation) (3), where p is the pore pressure, α is a poroelastic coefficient, and $K_0$ is a constant that may be obtained using calibration data such as leak-off tests, fluid losses incurred during drilling, data from hydraulic fracturing, etc. Equation (3) is sometimes referred to as the "poroelastic equation". Methods for the analysis of leak-off tests are known in the art. The pore pressure (p) used in equation (3) may be determined in permeable zones using direct measurements by tools such as the MDT or by well tests. In non-permeable formations, such as mudrocks, pore pressure (p) may be estimated using measurements of seismic or sonic velocities or by using resistivity measurements together with a velocity to pore pressure or a resistivity to pore pressure transform.

In an isotropic medium, such as a sand layer subject to anisotropic stresses, the maximum and minimum horizontal stress directions may be determined from the fast and slow shear wave directions obtained using dipole shear data from the Sonic Scanner. This approach is typically not available for shales. Accordingly, in deviated wells that pass through shale as well as sand layers, only the sandy layers are considered to obtain the fast shear azimuth, which is in turn used as an estimate of the azimuth of the maximum horizontal stress. In the shales, borehole breakout analysis is often used to determine the stress orientation. In vertical wells, the direction of breakouts corresponds to the azimuth of the minimum horizontal stress.

Because wave velocities in sedimentary rocks are stress-dependent, a shear wave in an isotropic medium subject to an anisotropic stress state will split into two shear-wave polarizations, one in the fast polarization direction and one in the slow polarization direction. The velocity of both of these waves may be determined from a dipole sonic tool in crossed-dipole mode. The shear wave anisotropy may be defined by $A=2(V_{S1}-V_{S2})/(V_{S1}+V_{S2})$, where $V_{S1}$ is fast shear wave velocity and $V_{S2}$ is the slow shear wave velocity.

Because shales are anisotropic due to a preferred orientation of anisotropic clay minerals, clean sands with a volume fraction of clay (VCL) below, e.g., a threshold of VCL≦0.2 should be chosen for the analysis, such that the measured anisotropy, e.g., $A=2(V_{S1}-V_{S2})/(V_{S1}+V_{S2})$, may be assumed to result from stress anisotropy. With this assumption, it is possible to use the shear wave splitting in an inversion of the Sonic Scanner data for the maximum horizontal stress as described below.

In addition to shear-wave splitting, an additional stress-dependent effect due to the increase in stress with increasing depth is an increase in velocity with increasing depth. An example showing the variation with respect to depth (TVD) in the P-wave velocity (P-velocity) and fast and slow shear wave velocities (Fast S-velocity and Slow S-velocity) for clean sands VCL≦0.2 with is shown in FIG. 3.

Figure 3:
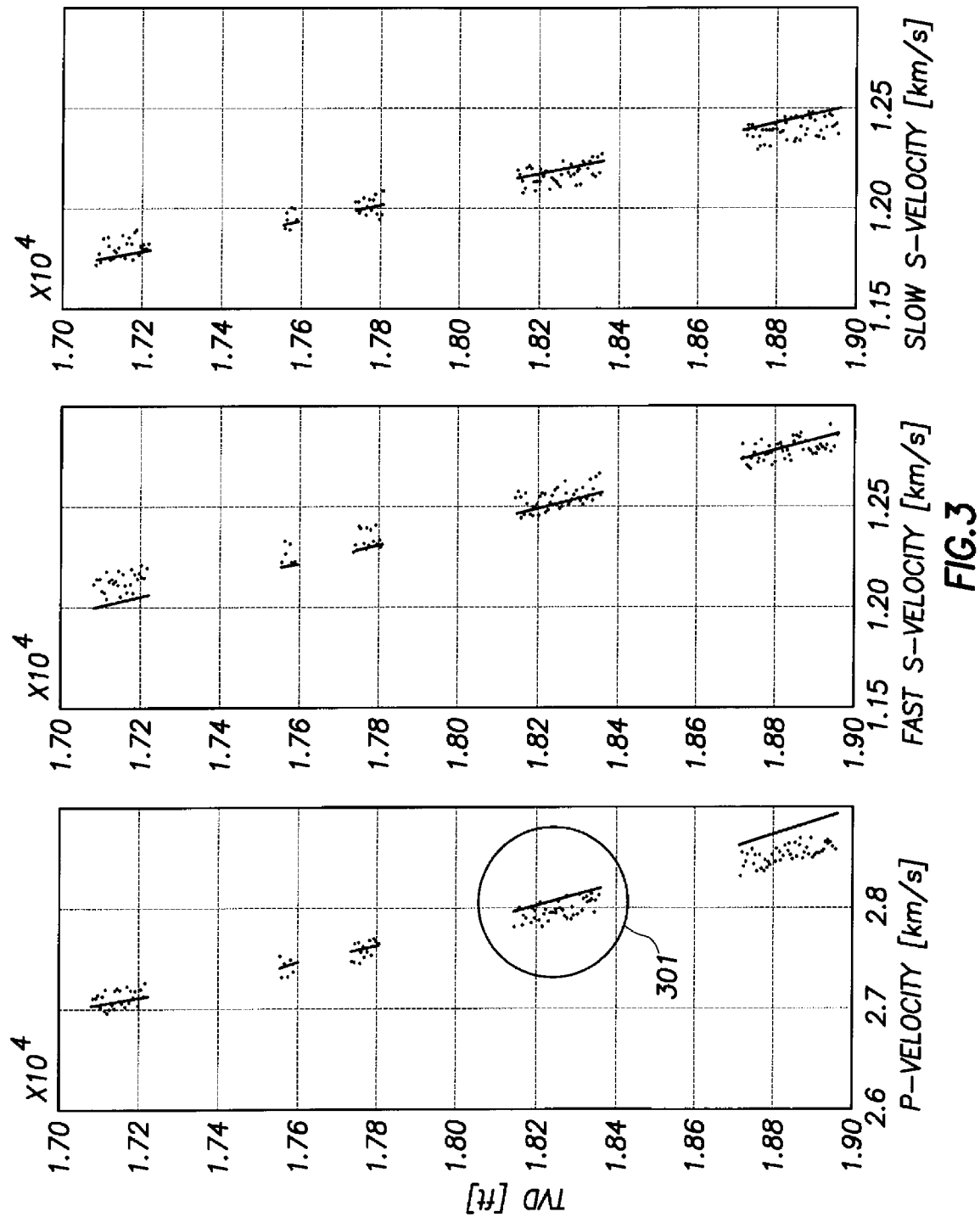
FIGS. 3-6 show example comparisons between measured and predicted velocities and shear wave anisotropy in accordance with one or more embodiments of determining maximum horizontal stress in an earth formation.

As shown in FIG. 3, each of the P-velocity, Fast S-velocity, and Slow S-velocity are plotted against the depth showing clusters (e.g., cluster 301) of dots and associated line segments. Each dot represents a measurement taken at a depth i and each cluster represents a sand interval identified, for example in element 206 of FIG. 2, based on volume fraction of clay (VCL). The line segment associated with each cluster represents predicted values of the P-velocity, Fast S-velocity, and Slow S-velocity, respectively (e.g., as calculated in element 218 of FIG. 2).

A petrophysical analysis is used to check that the variation in the velocities shown in FIG. 3 is not due to variations in porosity or due to variations in the volume content of clay, etc. If there is a variation in porosity and clay content, a correction may be made using, for example, a linear relation between velocity and porosity and clay content, where the coefficients are obtained by inversion. For the case shown in FIG. 3, the depth variation in velocities is due to variations in stress.

Figure 4:
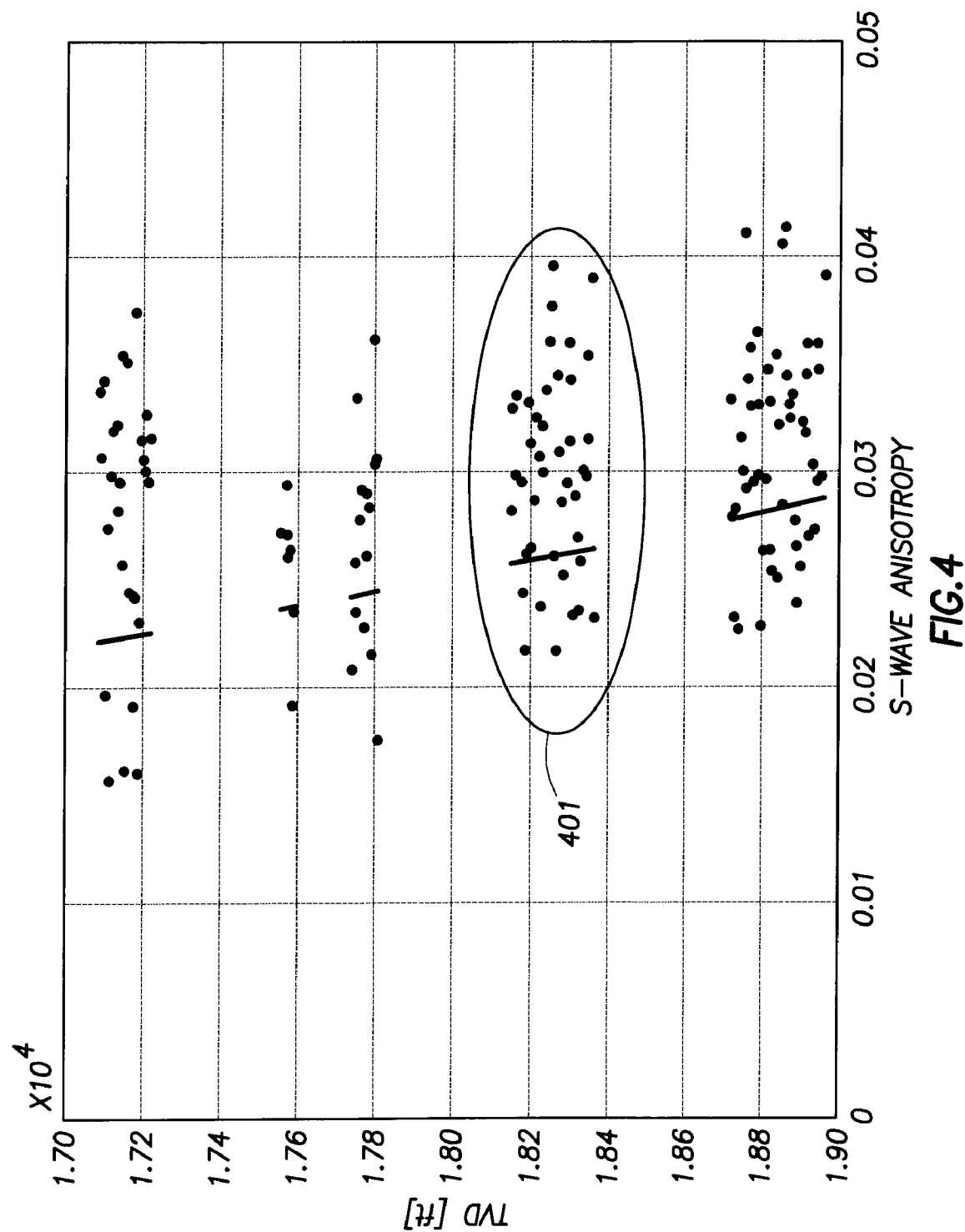

The example illustrating the method of FIG. 2 inverts the measured shear-wave anisotropy and the variation in velocities with depth as shown in FIG. 3 to determine the maximum horizontal stress while the vertical and minimum horizontal stress are obtained using conventional methods and are assumed to be correct. The following discussion describes an example for obtaining the maximum horizontal stress in accordance with embodiments described above. Turning to the example, elastic wave velocities in sandstones are sensitive to changes in stress due to the presence of stress-sensitive grain boundaries within the rock. It follows that a single parameter $Z^{(1)}$ is sufficient to describe the stress sensitivity and, hence, the depth-dependent velocities and stress-induced anisotropy of sandstones to first order in the change in effective stress ($\Delta\sigma_{ij}$) from a reference state of stress ($\sigma_{ij}^{(0)}$). To apply this model to the velocities determined using the Sonic Scanner, the analysis is restricted to clean sands identified (e.g., in element 206 of FIG. 2) using a VCL cut-off of 0.2. FIGS. 3 and 4 compare the measured (as denoted by the dots) and predicted (as denoted by the line segments) velocities (P-velocity and Fast/Slow S-velocity) and shear-wave anisotropy (S-wave anisotropy) defined by $A=2(V_{S1}-V_{S2})/(V_{S1}+V_{S2})$ for sands with VCL≦0.2. The computations shown below use the pore pressure, minimum horizontal stress and vertical stress obtained using conventional methods with the maximum horizontal stress estimated as the average of the vertical stress and minimum horizontal stress.

As shown in FIG. 4, S-wave anisotropy ($A^{data}$) based on measurement and predicted S-wave anisotropy ($A^{pred}$) are plotted against the depth showing clusters (e.g., cluster 401) of dots and associated line segments. Each dot represents $A^{data}$ taken at a depth i (or $A_i^{data}$) and each cluster represents a sand interval identified, for example in element 206 of FIG. 2, based on volume fraction of clay (VCL). The line segment associated with each cluster represents predicted values of S-wave anisotropy $A^{pred}$, for example as calculated in element 220 of FIG. 2.

Figure 5:
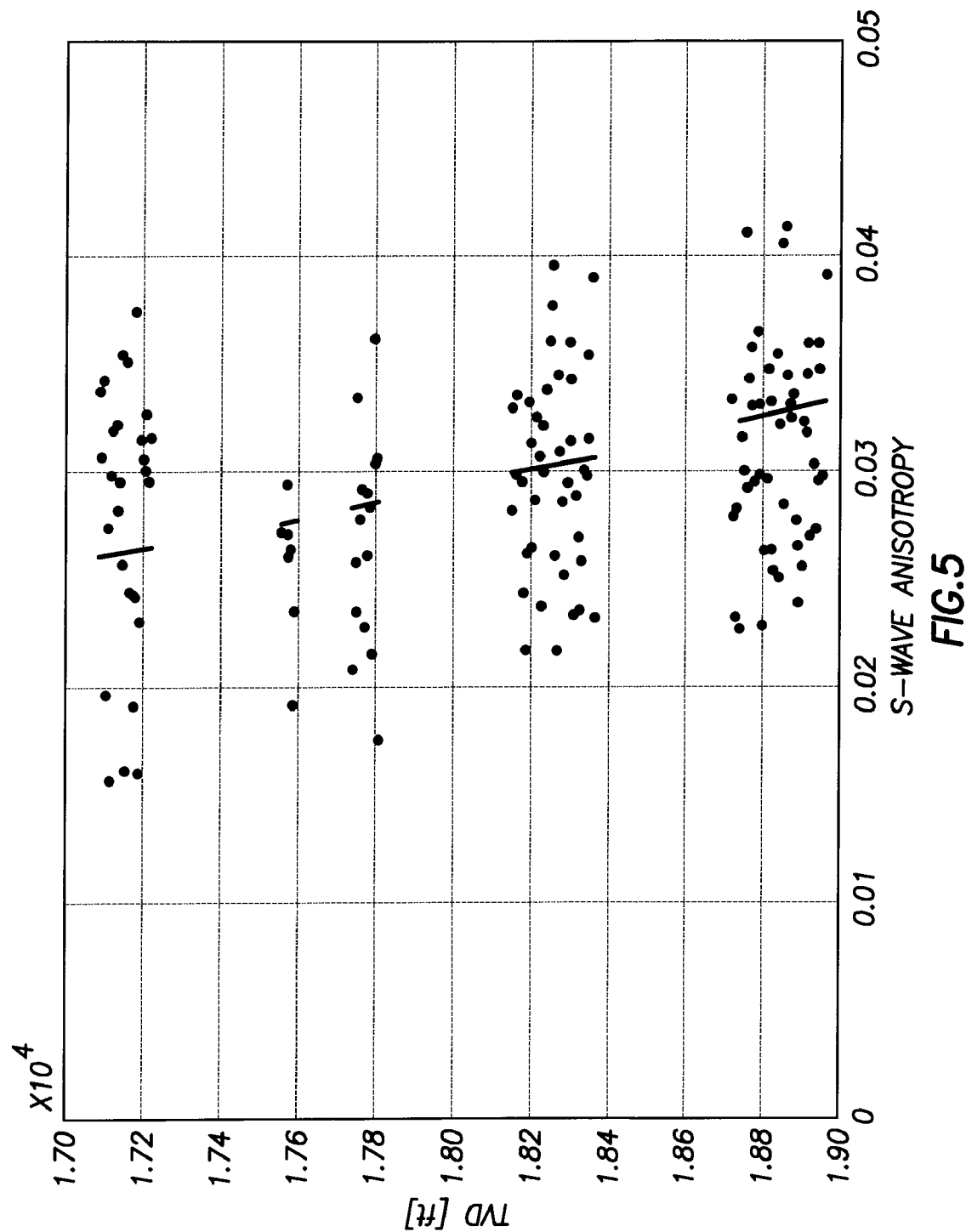
Figure 6:
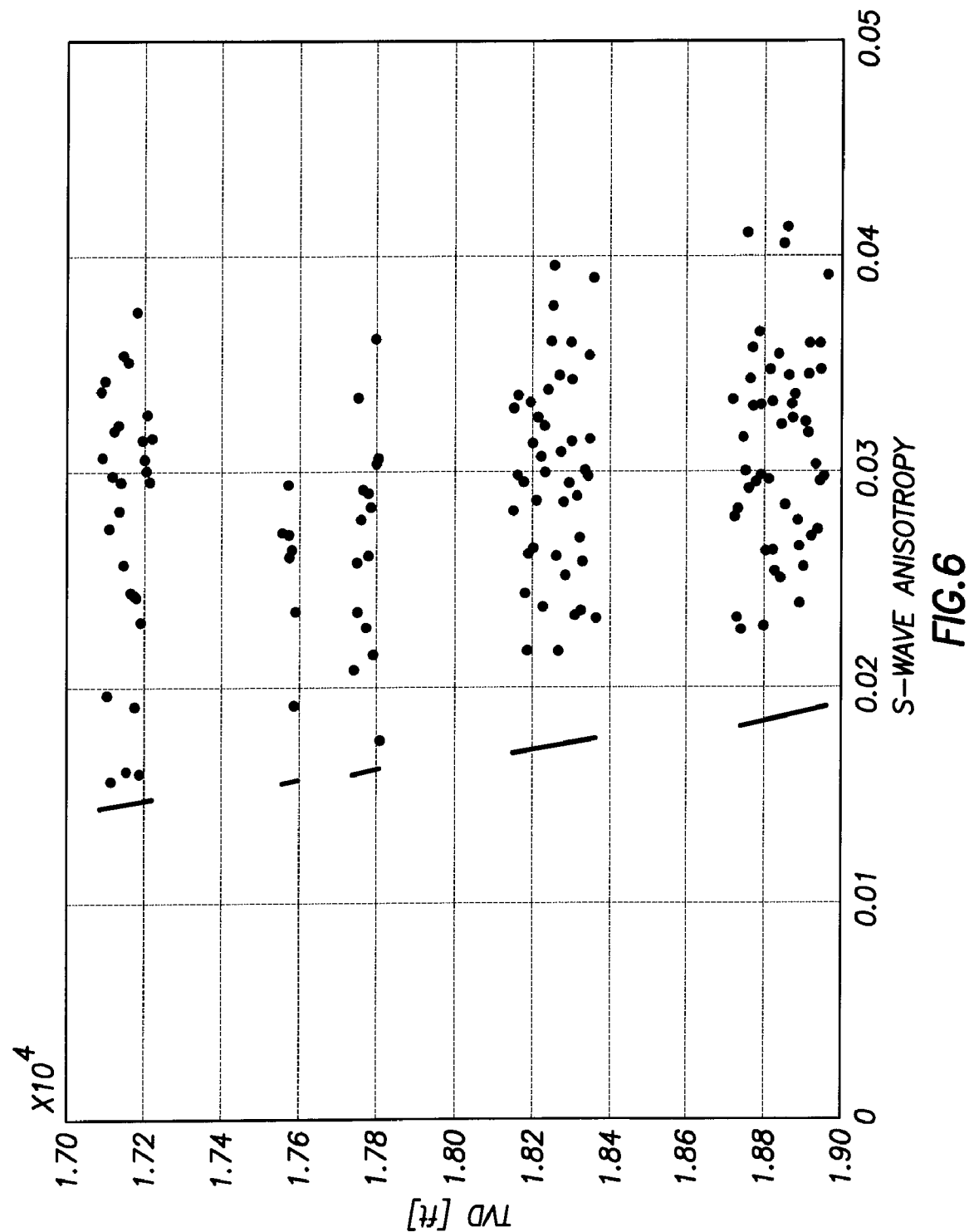

As described with respect to element 216 of FIG. 2, the maximum horizontal stress may be represented as a parameterized function in terms of the minimum horizontal stress $S_h$ and the vertical stress $S_V$. In the example shown in FIGS. 3 and 4, the maximum horizontal stress is represented in terms of the minimum horizontal stress $S_h$ and the vertical stress $S_V$ as $S_H=(1-c)S_h+cS_V$, where c=0.5. Increasing the value of c leads to an increase in predicted shear wave anisotropy as shown in FIG. 5 for c=0.7, while decreasing the value of c leads to an decrease in predicted shear wave anisotropy as shown in FIG. 6 for c=0.3. The predicted anisotropy may be plotted (not shown) against c and compared to measured anisotropy (0.031) to yield that the best estimate of the maximum horizontal stress is determined by $S_H=(1-c)S_h+cS_V$ with c=0.7. The final stress state with maximum horizontal stress is therefore determined by $S_H=(1-c)S_h+cS_V$ with c=0.7.

As described in element 222 of FIG. 2 above, a cost function $\mu_m$ may be defined to quantify the match between S-wave anisotropy ($A^{data}$) based on measurement and predicted S-wave anisotropy ($A^{pred}$) shown in FIGS. 4-6. The optimal value of the parameter c may then be determined by minimizing the cost function μm as described below.

The following are example pseudo code blocks 1 through block 19 by which embodiments of determining maximum horizontal stress in an earth formation may be implemented. Those skilled in the art will recognize that Greek letter notations are substituted, where applicable, by the pseudo code conventions where each Greek letter is spelled out in English alphabets, for example ρ is spelled out as rho and that subscript and superscript are flattened, for example $S_h$ is flattened as Sh. In addition, delta is shortened to d, for example Δα or delta alpha is shortened to dalpha, and Z(1) is shortened as Z1.

Those skilled in the art will recognize that blocks 1-3 correspond to elements 200, 202, 210, and 212 of FIG. 2 above, block 4 corresponds to element 204, block 5 corresponds to elements 206 and 208, blocks 6-11 and 16-17 correspond to elements 214, 216 and 221, blocks 12-15 correspond to element 218, block 18 corresponds to elements 220 and 222, block 19 corresponds to element 224.

Block 1. Build a mechanical earth model (MEM) including pore pressure, far-field stresses, elastic parameters using established geomechanical methods. For example, the pore pressure may be measured using the RFT/MDT or predicted using elastic wave velocity or resistivity measurements, the stress orientation may be determined from the fast shear wave polarization in clean sands or from borehole breakouts, the vertical stress may be estimated from an integral of the density log, while the minimum horizontal stress may be determined from leak-off test data.

Block 2. Calculate the vertical effective stress and effective minimum horizontal stress by subtracting the pore pressure from the vertical stress and minimum horizontal stress as follows:

$$sigma\_h = Sh - Pp$$

$$sigma\_V = SV - Pp, \text{ where } Pp \text{ represents pore pressure.}$$

Block 3. Load into the MEM a well deviation survey, density log, compressional wave velocity, fast shear wave velocity, slow shear wave velocity, fast shear wave azimuth, porosity and clay content.

Block 4. Using an equation such as $v = v_0 - a_1\phi - a_2 VCL$ determine a1 and a2 for compressional and for shear waves by regression over the depth interval of interest, where $\phi$ is the porosity and VCL is the volume fraction of clay. Further, determine the porosity and the clay corrected velocities using $v_{Corrected} = v_{Measured} + a_1\phi + a_2 VCL$. Those skilled in the art will appreciate that uncorrected velocities may be used.

Block 5. Compute the shear wave anisotropy using measured or corrected dipole shear data in the intervals containing clean sands using a cutoff, such as $VCL \leq 0.2$.

Block 6. Choose a reference depth, such as the midpoint of the depth interval of interest, where effective vertical stress and effective minimum horizontal stress at the reference depth are represented as an isotropic value sigma_ref.

Block 7. Calculate, at various depths, the difference in effective stress from reference state as follows:

$$stress22 = sigma\_h - sigma\_ref$$

$$stress33 = sigma\_V - sigma\_ref$$

Block 8. Using Gassmann's equation, as is known in the art, the compressional and shear wave velocities, the density, the porosity, and the bulk modulus of fluid Kf and rock grains K0, calculate the bulk modulus, K, and shear modulus, mu, of the rock frame at the reference depth. Calculate the elastic compliances $s_{ij}$ of the rock frame as follows:

$$vs = (vs1 + vs2)./2.;$$

$$mu = rho.*vs.*vs;$$

$$lambda = rho.*vp.*vp - 2.*mu, \text{ where vp represents P-wave velocity};$$

$$nu = lambda./(2.*(lambda + mu));$$

$$lambda = 2*mu*nu/(1 - 2*nu)$$

$$s11 = (lambda + mu)/(mu*(3*lambda + 2*mu))$$

$$s22 = s11$$

$$s33 = s11$$

$$s12 = -lambda/(2*mu*(3*lambda + 2*mu))$$

$$s13 = s12$$

$$s23 = s12$$

$$s44 = 1/mu$$

$$s55 = s44$$

$$s66 = s44$$

Block 9. Loop over c within a range from $c_{min}$ to $c_{max}$ with increments $c_{int}$.

Block 10. Loop over Z1 within a range of $(p_1, p_2, \ldots p_n)$.

Block 11. Write the maximum horizontal stress in the form $S_H = (1-c)S_h + cS_V$, and compute the effective maximum horizontal stress as follows:

$$sigma\_H = (1.-c).*sigma\ h + c.*sigma\_V$$

and the difference from the reference state as follows:
stress11 = sigma H - sigma_ref Block 12. Calculate changes in velocity using the theoretical model described below:

$$dalpha11 = 2*pi*(3*stress\ 11 + stress22 + stress33)*Z1/15$$

$$dalpha22 = 2*pi*(stress\ 11 + 3*stress22 + stress33)*Z1/15$$

$$dalpha33 = 2*pi*(stress11 + stress22 + 3*stress33)*Z1/15$$

$$ds11 = dalpha11$$

$$ds22 = dalpha22$$

$$ds33 = dalpha33$$

$$ds12 = 0$$

$$ds13 = 0$$

$$ds23 = 0$$

$$ds44 = dalpha22 + dalpha33$$

$$ds55 = dalpha11 + dalpha33$$

$$ds66 = dalpha11 + dalpha22$$

$$s11 = s11 + ds11$$

$$s55 = s55 + ds55$$

$s66 = s66 + ds66$, where s11, s22, and s33 equal $\sigma_1$, $\sigma_2$, and $\sigma_3$, respectively based on the definitions in blocks 7 and 11 above.

Block 13. Calculate elastic stiffnesses ($c_{ij}$) using the theoretical model described below:

$$c11 = (-s23^2 + s22*s33)/(-s11*s23^2 + s11*s22*s33 + 2*s23*s12*s13 - s22*s13^2 - s12^2*s33)$$

$$c22 = (s11s33 - s13^2)/(-s11s23^2 + s11s22*s33 + 2*s23*s12*s13 - s22*s13^2 - s12^2*s33)$$

$$c33 = (s11*s22 - s12^2)/(-s11*s23^2 + s11s22*s33 + 2*s23*s12*s13 - s22*s13^2 - s12^2*s33)$$

$$c44 = 1/s44$$

$$c55 = 1/s55$$

$$c66 = 1/s66$$

$$c12 = -(s12*s33 - s13*s23)/(-s11*s23^2 + s11*s22*s33 + 2*s23*s12*s13 - s22*s13^2 - s12^2*s33)$$

$$c13 = (-s13*s22 + s12*s23)/(-s11s23^2 + s11*s22*s33 + 2*s23*s12*s13 - s22*s13^2 - s12^2*s33)$$

$$c23 = -(s11*s23 - s12*s13)/(-s11s23^2 + s11*s22*s33 + 2*s23*s12*s13 - s22*s13^2 - s12^2*s33)$$

Block 14. Calculate $c_{ij}$ as the fluid saturated elastic stiffnesses using the anisotropic form of Gassmann's equation:

$$a1=1-(c11+c12+c13)/(3*K0);$$

$$a2=1-(c12+c22+c23)/(3*K0);$$

$$a3=1-(c13+c23+c33)/(3*K0);$$

$$Kstar=(c11+c22+c33+2*c12+2*c13+2*c23)/9;$$

$$M=K0/((1-Kstar/K0)-porosity*(1-K0/Kf));$$

$$c11=c11+a1*a1*M;$$

$$c22=c22+a2*a2*M;$$

$$c33=c33+a3*a3*M;$$

$$c12=c12+a1*a2*M;$$

$$c13=c13+a1*a3*M;$$

$$c23=c23+a2*a3*M$$

Block 15. Solve the Christoffel equations (as is known in the art) for the compressional and fast and slow shear-wave velocities for the appropriate well deviation and azimuth using the stress-dependent anisotropic stiffness tensor calculated above.

Block 16. Close loop over Z1 within a range from $c^{min}$ to $c_{max}$ with increments $c_{int}$.

Block 17. Close loop over c within a range of (p1, p2, ... pn).

Block 18. Determine the optimum values of c and Z(1) by selecting the value of these parameters that gives the best agreement with the observed shear-wave anisotropy. This may be done by choosing the vector of parameters $V=[c, Z^{(1)}]^T$ that minimizes the following cost function:

$$\mu_m = \sum_{i=1}^{N} \left| \frac{A_i^{data} - A_i^{pred}(v)}{\sigma_i} \right|^m$$

where the sum is over various depths indexed by i with clean sands, $A_i^{data}$ is the shear wave anisotropy determined at the ith depth from the dipole shear data, $A_i^{pred}$ is the shear wave anisotropy predicted for a given choice of $V=[c,Z^{(1)}]^T$ is the mathematical transpose operator), and $\sigma_i$ is an estimate of the error in the shear wave anisotropy at the ith depth. If an estimate of the error is unavailable, the value $\sigma_i=1$ may be used at various depth levels. The choice m=2 corresponds to least-squares inversion, while the choice m=1 is more robust in the presence of noise.

Block 19. Using the optimum set of parameters $V=[c, Z^{(1)}]^T$, compute the final estimate of the maximum horizontal stress using the equation $S_H=(1-c)S_h+cS_v$, and use to analyze and predict geomechanical problems.

The following is a description of the theoretical model referenced above. The theoretical model reveals the physical meaning of $Z^{(1)}$, which is used in conjunction with the parameter c in the parameterized function described in element 218 of FIG. 2. As described above, the parameterized function involves the determination of theoretical fast shear wave velocity and theoretical slow shear wave velocity from $S_V$, $S_h$, and $S_H$ for calculating $A_i^{Pred}$ (v). In embodiments of determining maximum horizontal stress in an earth formation, the value of $Z^{(1)}$ used in the parameterized function may be a fixed value that is either calculated using the theoretical model or measured using oilfield tools. In other embodiments, an initial calculated or measured value of $Z^{(1)}$ used in the parameterized function may be adjusted by optimizing a cost function, such as the cost function described in element 212 of FIG. 2 above.

The theoretical model is based on the assumption that the elastic wave velocities are a function of the effective stress tensor, $\sigma_{ij}$, which is assumed to be given in terms of the total stress tensor, $S_{ij}$, and the pore pressure, p, by $$\sigma_{ij}=S_{ij}-\eta p\delta_{ij}, \quad (A1)$$

where $\eta$ is the Biot-Willis parameter, $\delta_{ij}$ is the Kronecker delta, and $\delta_{ij}=1$ if j and 0 otherwise. Elastic wave velocities in sandstones vary with changes in effective stress due to the presence of stress-sensitive grain boundaries within the rock. It has been shown in the art that the elastic compliance tensor, $S_{ijkl}$, of a sandstone may be written in the form $$S_{ijkl}=S_{ijkl}^{\infty}+\Delta S_{ijkl}, \quad (A2)$$

where $S_{ijkl}^{\infty}$ is the compliance the rock would have if the grains formed a continuous network, and $\Delta S_{ijkl}$ is the excess compliance due to the presence of grain boundaries in the rock. $\Delta S_{ijkl}$ may be written as $$\Delta S_{ijkl} = \frac{1}{4}(\delta_{ik}\alpha_{jl} + \delta_{il}\alpha_{jk} + \delta_{jk}\alpha_{il} + \delta_{jl}\alpha_{ik}) + \beta_{ijkl} \quad (A3)$$

where $\alpha_{ij}$ is a second-rank tensor and $\beta_{ijkl}$ is a fourth-rank tensor defined by $$\alpha_{ij} = \frac{1}{V}\sum_r (B_T^{(r)}n_i^{(r)}n_j^{(r)}A^{(r)}) \quad (A4)$$

$$\beta_{ijkl} = \frac{1}{V}\sum_r (B_N^{(r)} - B_T^{(r)})n_i^{(r)}n_j^{(r)}n_k^{(r)}n_l^{(r)}A^{(r)} \quad (A5)$$

Here, the summation is over various grain contacts within volume V. $B_N^{(r)}$ and $B_T^{(r)}$ are the normal and shear compliance of the $r^{th}$ grain boundary, $n_i^{(r)}$ is the $i^{th}$ component of the normal to the grain boundary, and $A^{(r)}$ is the area of the grain boundary. If the normal and shear compliance of the discontinuities are equal, it follows from equation (A5) that the fourth-rank tensor $\beta_{ijkl}$ vanishes, and the elastic stiffness tensor is a function of $\alpha_{ij}$. This is a reasonable approximation for the grain contacts in sandstones and will be assumed in the following.

As has been shown in the art, it is assumed that the normal and shear compliance of a grain boundary are functions of the component of the effective stress acting normal to the plane of the boundary given by $\sigma_n=n_i\sigma_{ij}n_j$, where a sum over repeated indices is implied. The components of the normal n to a grain boundary or microcrack may be written in terms of polar angle $\theta$ and azimuthal angle $\phi$ shown in figure A1:

$$n_1=\cos\phi\sin\theta, n_2=\sin\phi\sin\theta \text{ and } n^3=\cos\theta \quad (A6).$$

Assuming a continuous orientation distribution of microcracks and grain boundaries, it follows from equation (A4) that $\alpha_{ij}$ may be written in the form $$\alpha_{ij} = \int_{\theta=0}^{\pi/2}\int_{\phi=0}^{2\pi} Z(\theta,\phi)n_i n_j \sin\theta \, d\theta \, d\phi \quad (A7)$$

where $Z(\theta,\phi)\sin\theta d\theta d\phi$ represents the compliance of various microcracks and grain boundaries with normals in the angular range between $\theta$ and $\theta+d\theta$ and $\phi$ and $\phi+d\phi$ in a reference frame $X_1X_2X_3$ with axis $X_3$ aligned with the normal to the grain boundary. Because the compliance of a grain boundary is a function of the effective stress acting on the plane of the grain boundary, $\alpha_{ij}$ will be anisotropic, even for an initially isotropic orientation distribution of microcracks or grain boundaries.

As has been shown in the art, it is assumed that the compliance of the grain boundaries decreases exponentially with increasing stress applied normal to the grain boundaries as follows:

$$Z = Z_O e^{-\sigma_n/\sigma_c} \tag{A8}$$

where $\sigma_c$ is a characteristic stress that determines the rate of decrease.

The elastic stiffness tensor may be found by inverting the compliance tensor given by equations (A2-A4). This allows the elastic wave velocities to be calculated.

A perturbation theory may be obtained by writing $\sigma_n = \sigma_n^{(0)} + \Delta\sigma_n$, where $\sigma_n^{(0)}$ is the value of $\sigma_n$ in the initial state of the reservoir, and $\Delta\sigma_n$ is the change in $\sigma_n$ due to production. It follows that, for small changes in stress, $$Z(\sigma_n) \approx Z^{(0)} + Z^{(1)}\Delta\sigma_n, \tag{A9}$$

where $Z^{(0)} = Z(\sigma_n^{(0)})$, and $Z^{(1)}$ is the first derivative of $Z$ with respect to $\sigma_n$, evaluated at $\sigma_n^{(0)}$. The non-vanishing components of the change $\Delta\alpha_{ij}$ in $\alpha_{ij}$ are $\Delta\alpha_{11}$, $\Delta\alpha_{22}$, and $\Delta\alpha_{33}$, given by $$\Delta\alpha_{11} = \frac{2\pi}{15}(3\Delta\sigma_1 + \Delta\sigma_2 + \Delta\sigma_3)Z_T^{(1)}, \tag{A10}$$

$$\Delta\alpha_{22} = \frac{2\pi}{15}(\Delta\sigma_1 + 3\Delta\sigma_2 + \Delta\sigma_3)Z_T^{(1)}, \tag{A11}$$

$$\Delta\alpha_{33} = \frac{2\pi}{15}(\Delta\sigma_1 + \Delta\sigma_2 + 3\Delta\sigma_3)Z_T^{(1)}, \tag{A12}$$

from which the change in the elastic stiffness tensor can be calculated. Note that T denotes the shear component of $Z^{(1)}$. It is found that for small changes in stress, the velocity of a vertically propagating compressional wave depends on the change in the radial and hoop stress through the combination $\Delta\sigma_{rr} + \Delta\sigma_{100\,\phi}$, and that the velocity of a vertically propagating, radially polarized, shear wave depends on the change in the vertical, radial and hoop stress through the combination $2(\Delta\sigma_{rr} + \Delta\sigma_{zz}) + \Delta\sigma_{100\,\phi}$. The velocity of a vertically propagating, radially polarized, shear wave is seen to be more sensitive to changes in the vertical and radial stress than to changes in the hoop stress.

In one or more embodiments of determining maximum horizontal stress in an earth formation, adjusting the oilfield operation may involve adjusting a drilling fluid density (i.e., increasing or decreasing the drilling fluid density as appropriate), adjusting a drilling trajectory (e.g., to avoid an overpressured area, to pass through a low-pressure area, etc.), optimizing the number of casing strings in the borehole (i.e., adding a casing string, delaying addition of a casing string, etc.), or any other similar type of adjustment.

Figure 7:
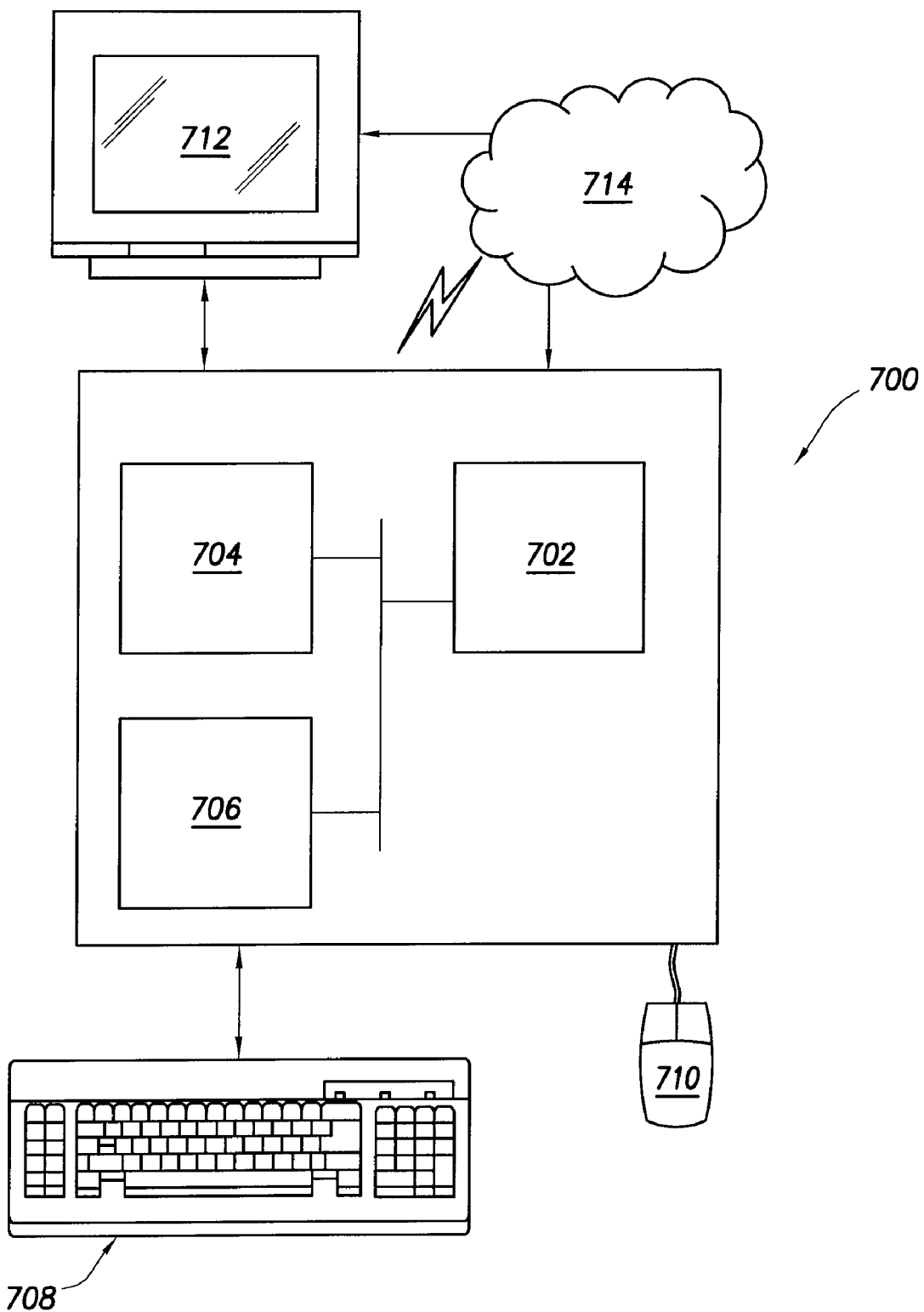
FIG. 7 shows a computer system in accordance with one or more embodiments of determining maximum horizontal stress in an earth formation.

Determining maximum horizontal stress in an earth formation may be implemented on virtually any type of computer regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) may be connected to a network (714) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, determining maximum horizontal stress in an earth formation may be implemented on a distributed system having a plurality of nodes, where each portion of determining maximum horizontal stress in an earth formation may be located on a different node within the distributed system. In one embodiment of determining maximum horizontal stress in an earth formation, the node corresponds to a computer system. Alternatively, the node may correspond to a processor with associated physical memory. The node may alternatively correspond to a processor with shared memory and/or resources. Further, software instructions to perform embodiments of determining maximum horizontal stress in an earth formation may be stored on a computer readable medium such as a compact disc (CD), a diskette, a tape, or any other computer readable storage device. In addition, in one embodiment of determining maximum horizontal stress in an earth formation, the maximum horizontal stress (including various intermediate data and calculations described in FIG. 2) may be displayed to a user via a graphical user interface (e.g., a display device such as the monitor (712)).

In one embodiment, determining maximum horizontal stress in an earth formation may be implemented using a processor and memory located in and/or within close proximity of a downhole tool. For example, the computer system (700) of FIG. 7 may be located within the surface unit (134) of FIG. 1B for displaying and/or storing maximum horizontal stress in relation to an earth formation.

While determining maximum horizontal stress in an earth formation has been described with respect to a limited number of embodiments, those skilled in the art, having benefit of this disclosure, will appreciate that other embodiments can be devised which do not depart from the scope of determining maximum horizontal stress in an earth formation as disclosed herein. Accordingly, the scope of determining maximum horizontal stress in an earth formation should be limited only by the attached claims.

What is claimed is:

1. A method for determining maximum horizontal stress in an earth formation, comprising:

obtaining fast shear wave velocities ($V_{s1}$) and slow shear wave velocities ($V_{s2}$) for various depths in the earth formation;

calculating shear wave anisotropy ($A^{data}$) using $V_{s1}$ and $V_{s2}$;

obtaining vertical stress ($S_v$) and minimum horizontal stress ($S_h$) for the formation;

representing maximum horizontal stress ($S_H$) using a parameterized function having at least one parameter and using $S_h$ and $S_v$ as input;

determining a value of the at least one parameter by minimizing a cost function that represents a measure of difference between $A^{data}$ and $A^{pred}$ for the various depths and $A^{pred}$ is predicted shear wave anisotropy determined using $S_v$, $S_h$, and $S_H$;

calculating $S_H$ using the parameterized function and the value of the at least one parameter; and storing $S_H$ in relation to the earth formation.

2. The method of claim 1, wherein the parameterized function is $S_H=(1-c)S_h+cS_v$, having C as the at least one parameter.

3. The method of claim 2, wherein $V_{s1}$ and $V_{s2}$ are corrected using $V=V_o-a_1\phi-a_2VCL$ prior to calculation of $A^{data}$, wherein V and $V_0$ represents corrected value and measured value, respectively, of one of $V_{s1}$ and $V_{s2}$, wherein $\phi$ is the porosity of the formation and VCL is a volume fraction of clay in the formation, and wherein $a_1$ and $a_2$ are pre-determined constants.

4. The method of claim 1, wherein the cost function is:

$$\mu_m = \sum_{i=1}^{N} \left| \frac{A_i^{data} - A_i^{pred}(v)}{\sigma_i} \right|^m,$$

wherein $A_i^{data}$ and $A_i^{pred}(V)$ are $A^{data}$ and $A^{pred}$, respectively, at $i^{th}$ depth of the various depths, wherein N is a maximum index of the various depths and m is a pre-determined constant, wherein $v=[c, Z^{(1)}]$ and $Z^{(1)}$ is a parameter in a function used to determine theoretical fast shear wave velocity and theoretical slow shear wave velocity from $S_v$, $S_h$, and $S_H$ for calculating $A_i^{pred}(v)$, and wherein and $\sigma_i$ is an estimate of error in $A_i^{data}$.

5. The method of claim 1, wherein the $A^{data}$ is calculated at the various depths in the formation comprising sand and clay where a volume fraction of clay is less than 0.2.

6. The method of claim 1, wherein the $A^{data}$ is calculated at the various depths in the formation comprising sand and clay where a volume fraction of clay is 0.2.

7. The method of claim 1, wherein the $A^{data}$ is calculated at the various depths in the formation comprising sand and clay where a volume fraction of clay is less than 0.4.

8. The method of claim 1, wherein the $A^{data}$ is calculated at the various depths in the formation comprising sand and clay where a volume fraction of clay is 0.4.

9. The method of claim 2, wherein c is a real number in the range of 0 to 2.0.

10. The method of claim 1, further comprising:
adjusting an oilfield operation based on $S_H$, wherein the oilfield operation is a proposed drilling operation.

11. The method of claim 1, further comprising:
adjusting an oilfield operation based on $S_H$, wherein the oilfield operation is associated with a deviated well, wherein $V_{s1}$ and $V_{s2}$ are obtained in the deviated well.

12. A non-transitory computer readable medium comprising instructions to perform a method for adjusting an oilfield operation, the method comprising:
obtaining fast shear wave velocities ($V_{s1}$) and slow shear wave velocities ($V_{s2}$) for various depths in a formation;
calculating shear wave anisotropy ($A^{data}$) using $V_{s1}$ and $V_{s2}$;
obtaining vertical stress ($S_v$) and minimum horizontal stress ($S_h$) for the formation;
calculating maximum horizontal stress ($S_H$) using $S_H=(1-c)S_h+cS_v$, wherein c is determined by minimizing a cost function that represents a measure of difference between $A^{data}$ and $A^{pred}$ for the various depths and $A^{pred}$ is predicted shear wave anisotropy determined using $S_v$, $S_h$, and $S_H$; and
adjusting the oilfield operation using $S_H$.

13. The non-transitory computer readable medium of claim 12, wherein $V_{s1}$ and $V_{s2}$ are corrected using $V=V_o-a_1\phi-a_2VCL$ prior to calculation of $A^{data}$, wherein V and $V_0$ represents corrected value and measured value, respectively, of one of $V_{s1}$ and $V_{s2}$, wherein $\phi$ is the porosity of the formation and VCL is a volume fraction of clay in the formation, and wherein $a_1$ and $a_2$ are pre-determined constants.

14. The non-transitory computer readable medium of claim 12, wherein the cost function is:

$$\mu_m = \sum_{i=1}^{N} \left| \frac{A_i^{data} - A_i^{pred}(v)}{\sigma_i} \right|^m,$$

wherein $A_i^{data}$ and $A_i^{pred}(v)$ are $A^{data}$ and $A^{pred}$, respectively, at ith depth of the various depths, wherein N is a maximum index of the various depths and m is an empirical constant, wherein $v=[c,Z^{(1)}]$ and $Z^{(1)}$ is a parameter in a function used to determine theoretical fast shear wave velocity and theoretical slow shear wave velocity from $S_v$, $S_h$, and $S_H$ for calculating $A_i^{pred}(v)$, and wherein and $\sigma_i$ is an estimate of error in $A_i^{data}$.

15. The non-transitory computer readable medium of claim 12, wherein the $A^{data}$ is calculated at depths in the formation comprising sand and clay where a volume fraction of clay is in the range of 0 to 0.4.

16. The non-transitory computer readable medium of claim 12, wherein c is a real number in the range of 0 to 2.0.

17. The non-transitory computer readable medium of claim 12, wherein the oilfield operation is a proposed drilling operation.

18. A system for determining maximum horizontal stress in an earth formation, comprising:
a downhole tool configured to obtain fast shear wave velocities ($V_{s1}$), slow shear wave velocities ($V_{s2}$), vertical stress ($S_v$), and minimum horizontal stress ($S_h$) for various depths in the earth formation; and
a surface unit comprising:
a processor; and
memory having instructions when executed by the processor comprising functionality to:
calculate shear wave anisotropy ($A^{data}$) using $V_{s1}$ and $V_{s2}$,
represent maximum horizontal stress ($S_H$) using a parameterized function having at least one parameter, wherein the parameterized function uses $S_h$ and $S_v$ as input,
determine a value of the at least one parameter by minimizing a cost function, wherein the cost function represents a measure of difference between $A^{data}$ and $A^{pred}$ for the various depths, and wherein $A^{pred}$ is predicted shear wave anisotropy determined using $S_v$, $S_h$, and $S_H$, and
calculate $S_H$ using the parameterized function and the value of the at least one parameter; and
a display having functionality to display $S_H$ in relation to the earth formation.

19. The system of claim 18, wherein the parameterized function is $S_H=(1-c)S_h+cS_v$, having c as the at least one parameter.

20. The system of claim 18, wherein the cost function is:

$$\mu_m = \sum_{i=1}^{N} \left| \frac{A_i^{data} - A_i^{pred}(v)}{\sigma_i} \right|^m,$$

wherein $A_i^{data}$ and $A_i^{pred}(v)$ are A and $A_{pred}$, respectively, at ith depth of the various depths, wherein N is a maximum index of the various depths and m is an empirical constant, wherein $v=[c, Z^{(1)}]$ and $Z^{(1)}$ is a parameter in a function used to determine theoretical fast shear wave velocity and theoretical slow shear wave velocity for calculating $A_i^{pred}(v)$ from $S_v$, $S_h$, and $S_H$, and wherein and $\sigma_i$ is an estimate of error in $A_i^{data}$.

* * * * *